US012702628B2

(12) United States Patent
Parry et al.

(10) Patent No.: US 12,702,628 B2
(45) Date of Patent: Aug. 11, 2026

(54) BREASTFEEDING NIPPLE SHIELD WEANING SYSTEM AND METHOD OF USE

(71) Applicants: Lindsey Parry, Leeds, UT (US); Mikel Parry, Leeds, UT (US)

(72) Inventors: Lindsey Parry, Leeds, UT (US); Mikel Parry, Leeds, UT (US)

( * ) Notice: Subject to any disclaimer, the term of this patent is extended or adjusted under 35 U.S.C. 154(b) by 1525 days.

(21) Appl. No.: 17/017,285

(22) Filed: Sep. 10, 2020

(65) Prior Publication Data

US 2021/0069067 A1 Mar. 11, 2021

Related U.S. Application Data

(60) Provisional application No. 62/911,741, filed on Oct. 7, 2019, provisional application No. 62/898,467, filed on Sep. 10, 2019.

(51) Int. Cl.
*A61J 13/00* (2006.01)

(52) U.S. Cl.
CPC .................................... *A61J 13/00* (2013.01)

(58) Field of Classification Search
CPC .......... A61J 13/00; A61M 1/06; A61M 1/062; A61M 1/064; A61M 1/067; A61M 1/06935
USPC ............................................ 128/890; 604/74
See application file for complete search history.

(56) References Cited

U.S. PATENT DOCUMENTS

| | | | | |
|---|---|---|---|---|
| 8,469,771 B2 * | 6/2013 | Francis | A61J 13/00 604/74 |
| 2005/0059927 A1 * | 3/2005 | Buiatti | A61J 13/00 604/74 |
| 2009/0283101 A1 * | 11/2009 | Mans | A61J 13/00 128/890 |
| 2011/0054374 A1 | 3/2011 | Hyde-Edwards et al. | |
| 2012/0101575 A1 * | 4/2012 | Horne | A61B 17/00 249/55 |
| 2018/0000652 A1 | 1/2018 | Hufnagal | |

FOREIGN PATENT DOCUMENTS

| | | |
|---|---|---|
| BR | 102018010994 A2 | 12/2019 |
| WO | WO2015051388 A1 | 4/2015 |

OTHER PUBLICATIONS

Mamivac Nipple Shields—Protect Sore or Sesitive Nipples Earthmother URL: https://www.earthmother.ie/mamivac-nipple-shields-protect-sore-or-sensitive-nipples.html.

* cited by examiner

*Primary Examiner* — Alireza Nia
*Assistant Examiner* — Robin Han
(74) *Attorney, Agent, or Firm* — Gurr & Brande, PLLC; Robert A. Gurr

(57) ABSTRACT

A plurality of nipple shields are disclosed, with each nipple shield having a protrusion that terminates with an aperture encompassing the top circumference (i.e., open top) for allowing a nipple to exit. Each nipple shield may be used alone or in combination, as a system of nipple shields. A first nipple shield may have a first base and a first protrusion terminating in a first aperture. A second nipple shield may have a second base and a second protrusion with a second aperture that is greater than the first, and a third nipple shield may have a third base and a third protrusion with a third aperture greater than the second.

2 Claims, 8 Drawing Sheets

BREASTFEEDING NIPPLE SHIELD WEANING SYSTEM AND METHOD OF USE

CROSS-REFERENCE TO RELATED APPLICATIONS

This application claims the benefit of U.S. Provisional Application Ser. No. 62/898,467, filed on Sep. 10, 2019, and U.S. Provisional Application Ser. No. 62/911,741, filed on Oct. 7, 2019, both of which are incorporated herein by reference.

TECHNICAL FIELD

The present disclosure relates to nipple shields for breastfeeding. More particularly, the present disclosure relates to a series of nipples shields and uses therefor, including 1) a method of transitioning from using a nipple shield during breastfeeding to breastfeeding without using a nipple shield, 2) using a nipple shield during breastfeeding to transition from breastfeeding to bottle feeding, 3) protecting the nipple from biting during breastfeeding, and 4) accommodating various nipple sizes while breastfeeding.

BACKGROUND

A newborn can bring many challenges and changes to life. Mothers often struggle with breastfeeding their newborn children. Specifically, breastfeeding may be difficult for women due to nipple sensitivity (e.g., sore, blistered, or cracked nipples), inverted or flat nipples, or overactive let-down. Other difficulties to breastfeeding may come from the child and not the mother. For example, the child may have difficulty latching due to a lip tie or a tongue tie. Additionally, if the child is a preemie baby, it may not be able to suckle properly. To get around these breastfeeding issues, many women utilize a nipple shield, which has been used for many years. The nipple shield is a nipple-shaped sheath worn over the nipple and a portion of the breast during breastfeeding. The nipple shield helps shield and protect a mother's nipple while breastfeeding. Further, the nipple shield assists a child when it comes to latching to a mother by creating better suction for the child and placing the nipple in a desired and repeatable location for the child.

However, while the use of nipple shields is beneficial, there are several issues that remain unsolved. For example, a child may become dependent on using the nipple shield for breastfeeding and may not otherwise properly latch onto the mother's nipple without it. This can present difficulties when a mother wants to stop using the nipple shield. In addition, it should be noted that the nipple shields found in the prior art are constructed to enclose a woman's nipple. The milk exits through small holes on the top of the nipple shield that encloses the woman's nipple. These holes can cause damage to a woman's nipple. Specifically, when a child suckles on a mother's nipple with the nipple shield, the nipple, if sucked on hard enough, may be pulled through small holes on the nipple cover, which may cause blisters, scarring, etc.

Further, because the nipple shield has an enclosed part around a woman's nipple, it may be difficult to determine which size of nipple shield needs to be used. It may be difficult due to the fact that women's nipples are shaped and sized differently, which means many nipple shields do not fit properly. The enclosed nipple shield also prevents a child from coming into contact with, or smelling, the mother's breast and nipple. Without contact with the mother's skin, the child may never be able to fully transfer from the nipple shield to breastfeeding.

Accordingly, there remains a need for 1) a nipple shield that is one size fits all; 2) a system and method that allows a child to gradually get used to more, or less, shield; and 3) an apparatus that prevents damage to the nipple. The present disclosure seeks to solve these and other problems.

SUMMARY OF EXAMPLE EMBODIMENTS

In one embodiment, a system of nipple shields comprises a first nipple shield having a first base and a first protrusion with a first aperture. A second nipple shield comprising a second base and a second protrusion with a second aperture. A third nipple shield comprising a third base and a third protrusion with a third aperture. The first, second, and third bases may be made of a malleable material, such as silicone or any other malleable material suitable for suckling children. The first, second, and third bases may be dome shaped so as to receive a portion of a breast.

In one embodiment, a system of nipple shields comprises a first nipple shield having a first base with a first cutout portion, and a first protrusion with a first aperture. A second nipple shield comprising a second base with a second cutout portion, and a second protrusion with a second aperture. A third nipple shield comprising a third base with a third cutout portion, and a third protrusion with a third aperture. The first, second, and third bases may be made of a malleable material, such as silicone or any other malleable material suitable for suckling children. The first, second, and third bases may be dome shaped so as to receive a portion of a breast. Further, the first, second, and third cutout portions may allow a child to have more skin-to-skin contact with their mother.

In one embodiment, a system and method of using nipple shields to transition the child away from a nipple shield and back to its mother comprises a mother using a first nipple shield having a first protrusion with a first aperture, covering a majority of her nipple; transitioning a child to the second nipple shield having a second protrusion with a second aperture that covers less than the first nipple shield; transitioning to a third nipple shield having a third protrusion with a third aperture that covers less than the first and second nipple shields; and transitioning to a bare breast and nipple.

In one embodiment, a system and method of using nipple shields to transition the child away from a mother and to a bottle comprises a mother using a third nipple shield having a third protrusion with a third aperture, uncovering a majority of her nipple; transitioning a child to a second nipple shield having a second protrusion with a second aperture that covers more than the third nipple shield; transitioning to a first nipple shield having a first protrusion with a first aperture that covers more than the third and second nipple shields; and transitioning to a bottle.

In one embodiment, a nipple shield comprises base for receiving a portion of a breast and a protrusion extending outwardly from the base, the protrusion terminating in an aperture that encompasses the circumference of the protrusion (i.e., the top of the protrusion is open), allowing a nipple to exit when a child is suckling.

DETAILED DESCRIPTION OF EXAMPLE EMBODIMENTS

Figure 1C:
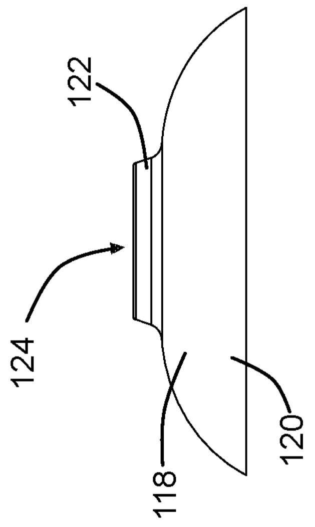
FIG. 1C illustrates a side elevation view of a third nipple shield of a system of nipple shields.
Figure 1B:
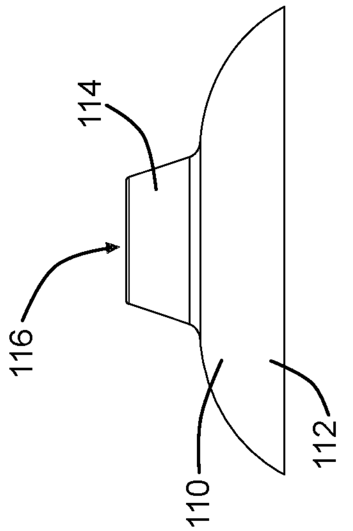
FIG. 1B illustrates a side elevation view of a second nipple shield of a system of nipple shields.
Figure 1A:
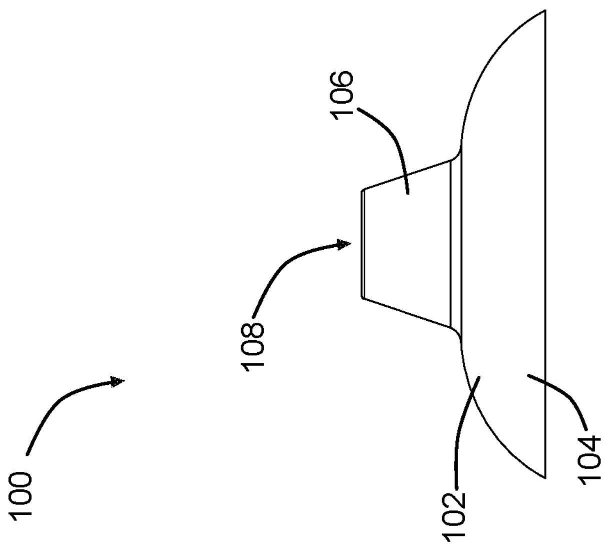
FIG. 1A illustrates a side elevation view of a first nipple shield of a system of nipple shields.
Figure 2A:
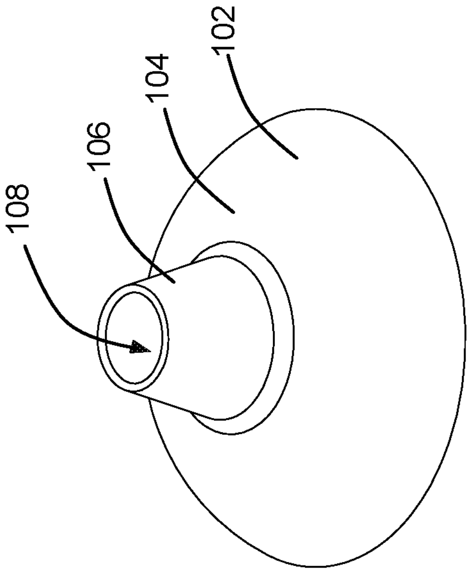
FIG. 2A illustrates a top perspective view of a first nipple shield of a system of nipple shields.
Figure 2B:
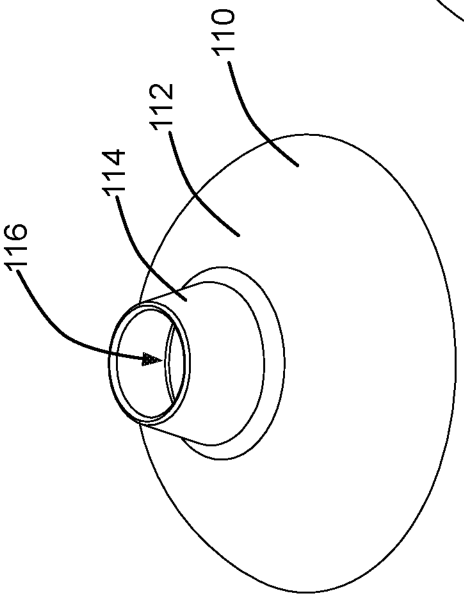
FIG. 2B illustrates a top perspective view of a second nipple shield of a system of nipple shields.
Figure 2C:
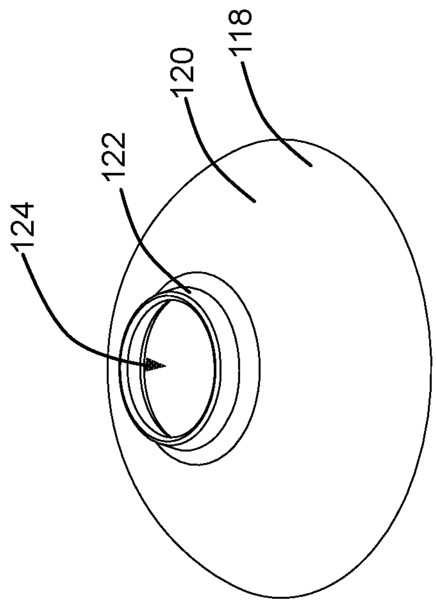
FIG. 2C illustrates a top perspective view of a third nipple shield of a system of nipple shields.
Figure 3C:
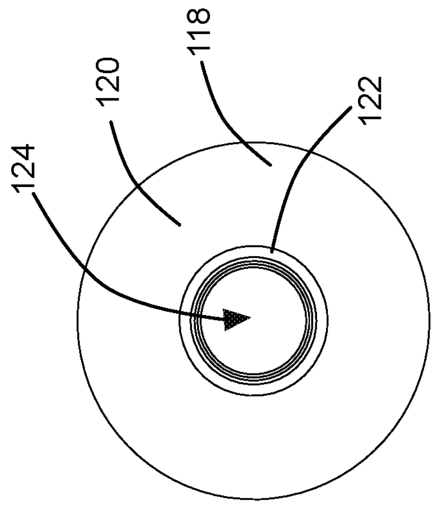
FIG. 3C illustrates a top plan view of a third nipple shield of a system of nipple shields.
Figure 3B:
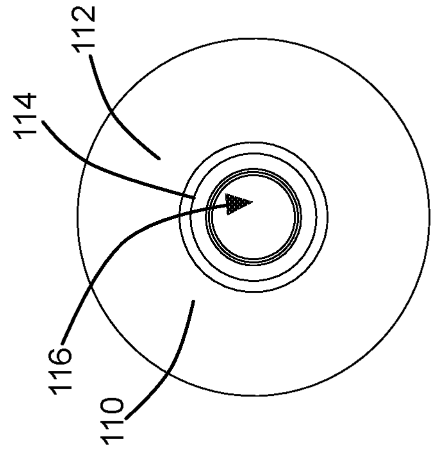
FIG. 3B illustrates a top plan view of a second nipple shield of a system of nipple shields.
Figure 3A:
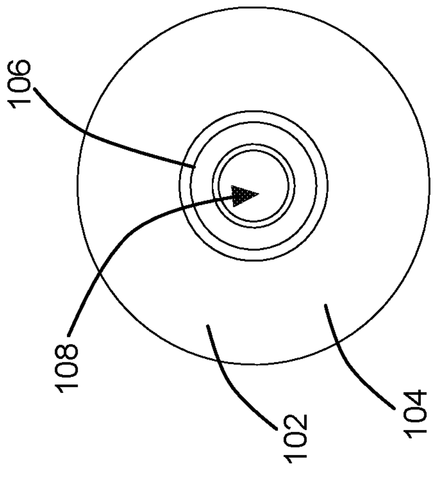
FIG. 3A illustrates a top plan view of a first nipple shield of a system of nipple shields.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there remains a need for 1) a nipple shield that is one size fits all; 2) a system and method that allows a child to gradually get used to more or less shield; and 3) an apparatus that prevents damage to the nipple from a child's teeth while still allowing proper suckling and access to the nipple. The nipple shields, system, and method of use disclosed herein solve these and other problems.

Figure 4C:
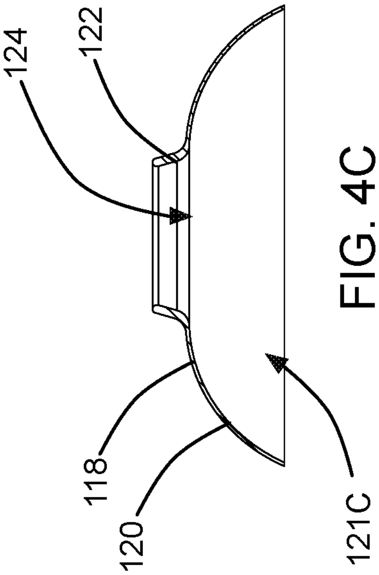
FIG. 4C illustrates a side cross-sectional view of a third nipple shield of a system of nipple shields.
Figure 4A:
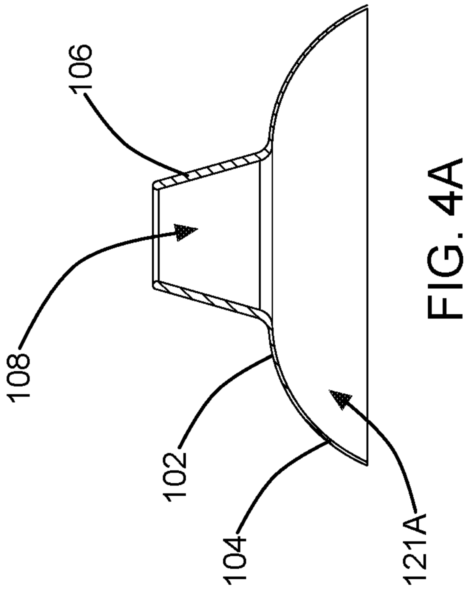
FIG. 4A illustrates a side cross-sectional view of a first nipple shield of a system of nipple shields.
Figure 4B:
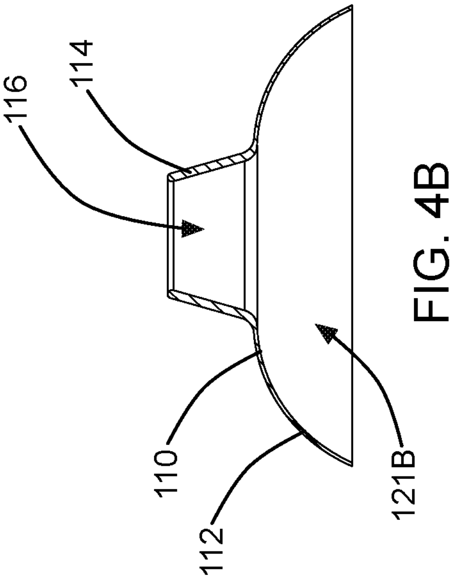
FIG. 4B illustrates a side cross-sectional view of a second nipple shield of a system of nipple shields.
Figure 5:
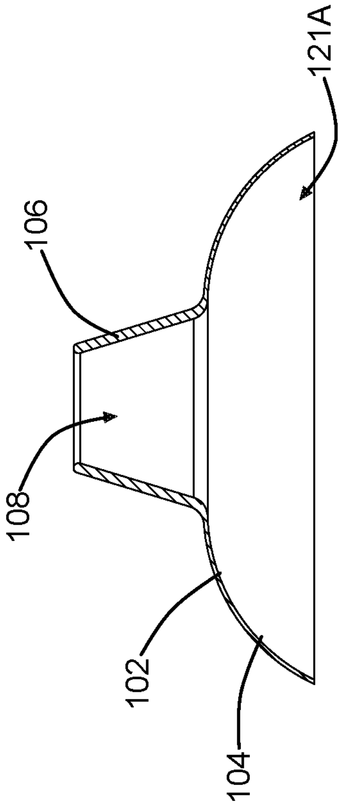
FIG. 5 illustrates a side cross-sectional view of a first nipple shield of a system of nipple shields.
Figure 6:
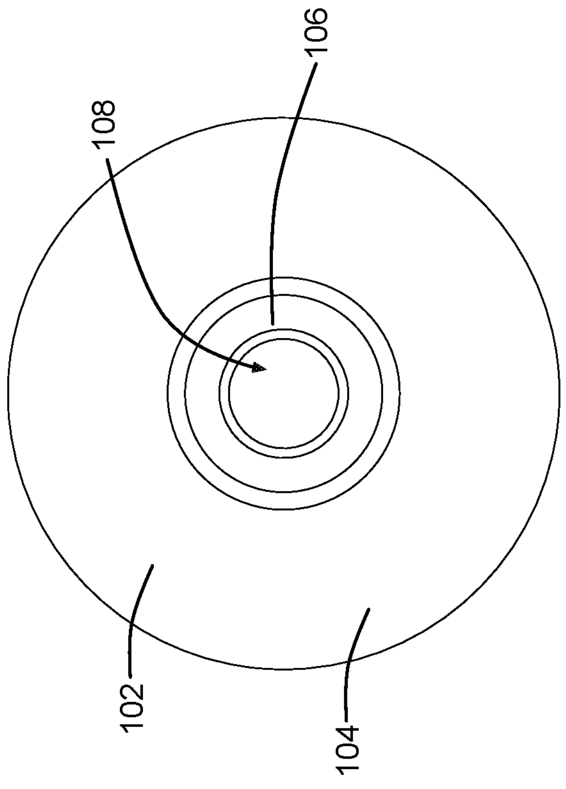
FIG. 6 illustrates a top plan view of a first nipple shield of a system of nipple shields.
Figure 7A:
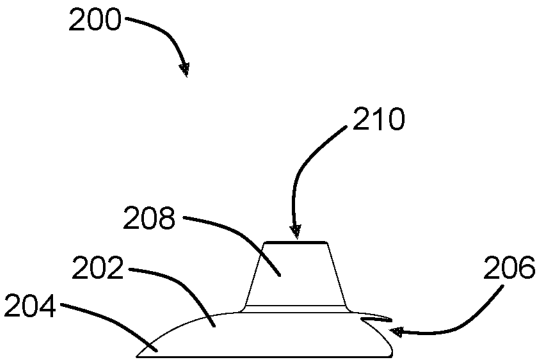
FIG. 7A illustrates a side elevation view of a first nipple shield of a system of nipple shields.
Figure 7B:
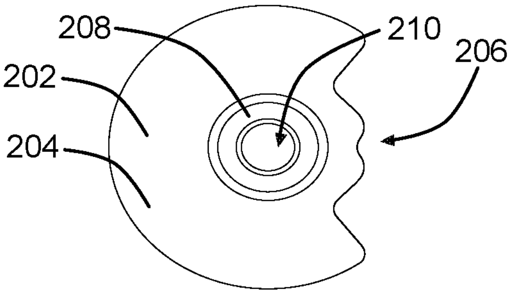
FIG. 7B illustrates a top plan view of a first nipple shield of a system of nipple shields.
Figure 7C:
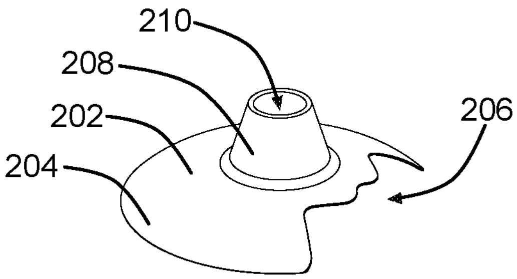
FIG. 7C illustrates a top perspective view of a first nipple shield of a system of nipple shields.
Figure 7D:
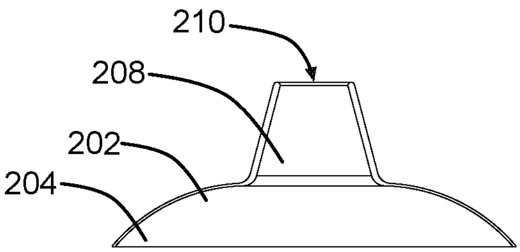
FIG. 7D illustrates a side elevation view of a first nipple shield of a system of nipple shields.
Figure 8A:
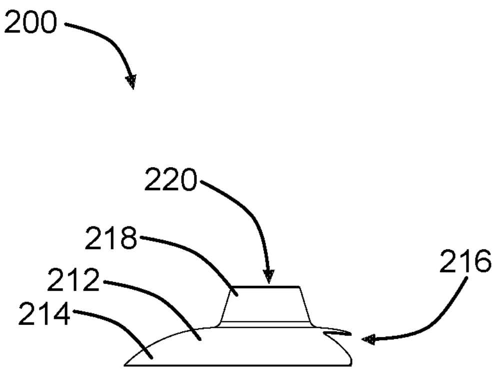
FIG. 8A illustrates a side elevation view of a second nipple shield of a system of nipple shields.
Figure 8B:
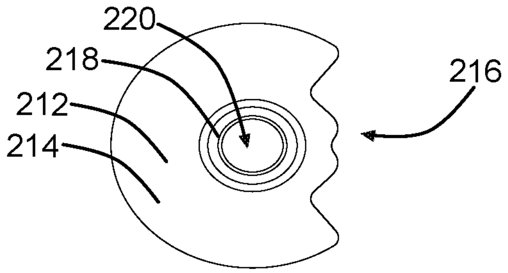
FIG. 8B illustrates a top plan view of a second nipple shield of a system of nipple shields.
Figure 8C:
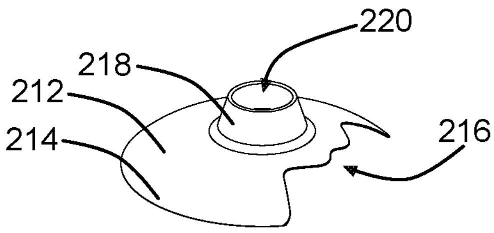
FIG. 8C illustrates a top perspective view of a second nipple shield of a system of nipple shields.
Figure 8D:
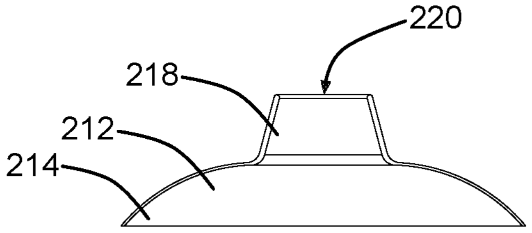
FIG. 8D illustrates a side elevation view of a second nipple shield of a system of nipple shields.
Figure 9A:
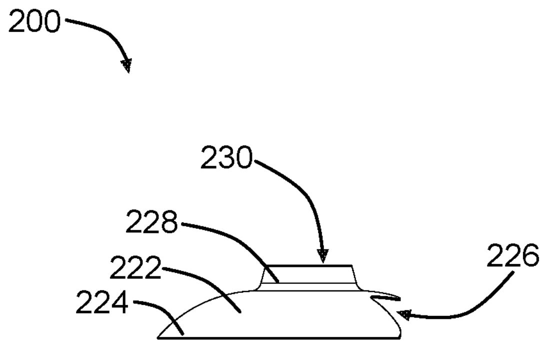
FIG. 9A illustrates a side elevation view of a third nipple shield of a system of nipple shields.
Figure 9B:
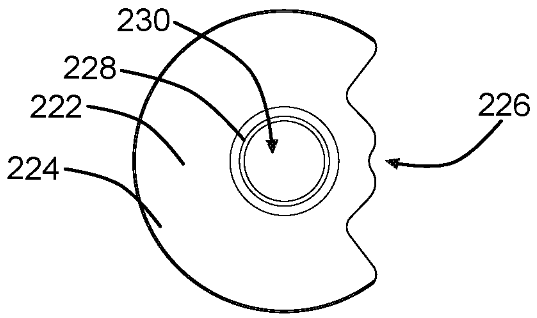
FIG. 9B illustrates a top plan view of a third nipple shield of a system of nipple shields.
Figure 9C:
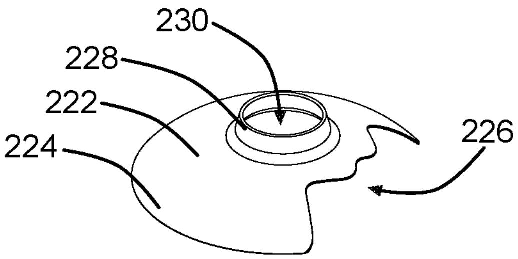
FIG. 9C illustrates a top perspective view of a third nipple shield of a system of nipple shields.
Figure 9D:
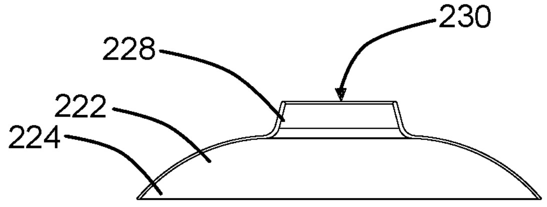
FIG. 9D illustrates a side elevation view of a third nipple shield of a system of nipple shields.

As shown in FIGS. 1A-4C, in one embodiment, a system of nipple shields 100 comprises a plurality of nipple shields 102, 110, 118. The first nipple shield 102 comprises a first base 104 and a first protrusion 106 with a first aperture 108. The second nipple shield 110 comprises a second base 112 and a second protrusion 114 with a second aperture 116. The third nipple shield 118 comprises a third base 120 and a third protrusion 122 with a third aperture 124. The first, second, and third bases 104, 112, 120 may be sized the same, or differently, and made of a malleable material, such as silicone, rubber, latex, or any other malleable material suitable for child and mother during breastfeeding. As best shown in FIGS. 4A-4C, the first, second, and third bases 104, 112, 120 may be dome shaped or other similar shapes, wherein the dome shape may create a void 121A, 121B, 121C so as to receive a portion of a breast.

Further, the first, second, and third nipple shields 102, 110, 118 may be transparent or opaque. In one embodiment, the first, second, and third nipple shields 102, 110, 118 may be color coded so that a mother may be assisted in quickly choosing the correct nipple shield. For example, the first nipple shield may be red, the second nipple shield may be blue, and the third nipple shield may be green. Additionally, the color-coded nipple shields may be semi-transparent or opaque. While colors are used as an example, the invention is not limited to those colors, nor are colors required. Further, in another example, a texture and/or coloring may be used. For example, in one embodiment, the nipple shield 102, 110, 118 may be textured and/or colored so as to resemble skin.

The first nipple shield 102 comprises the first protrusion 106 that extends outward from the pinnacle of the dome shaped first base 104. The first protrusion 106 may be conically shaped and has a first height, which is greater in height than both the second and third protrusions 114, 122. In one embodiment, the first protrusion 106 may be a height of 31 mm from a bottom of the first base 104 to a top of the first protrusion 106. However, any other height could be utilized for the first protrusion 106 that would offer the most protection to the mother. The first protrusion 106 gives the most protection to the mother as well as limiting the amount of nipple and breast exposed to the child. With the first nipple shield 102 having the greatest protrusion height (compare FIGS. 1A-1C), it is the most helpful in getting a baby to latch to its mother. For example, the first protrusion 106 positions a woman's nipple in a repeatable position, making it easy for the child to consistently latch and suckle. Additionally, the first protrusion 106 comprises the first aperture 108. The first aperture 108 is a diameter that is less than both the second and third apertures 116, 124 (compare FIGS. 3A-3C). In one embodiment, the first aperture 108 may have a diameter of 14 mm. While 14 mm may be used as the first aperture 108 diameter, it will be understood that other diameters may be used for the first aperture 108. However, it will be appreciated that the top of the protrusion 106 is not enclosed, as found in nipple shields of the art, but rather, the entire top of the aperture 106 forms the aperture 108, allowing the nipple to pass therethrough as needed.

Additionally, the wall thickness of the protrusion 106 may be greater than the wall thickness of protrusions 114, 122. In one non-limiting example, the wall thickness of protrusion 106 may be 1.25 mm, while the thickness of protrusion 114 may be 1.03 mm, while the thickness of protrusion 122 may be 0.80 mm. The hardness of the material used for each protrusion 106, 114, 122 (also referred to as the Durometer of the material) may likewise vary. For example, the thicker material of protrusion 106 may have a greater hardness than protrusions 114, 116. This allows the protrusion to have a more natural feel (i.e., closer to bare nipple) as the more open nipple shields 110, 118 are used, allowing a child to transition easier. Alternatively, the protrusions 106, 114, 116 may comprise a soft material so as to fold when a child sucks, which may reduce access to the mother. The mother may then remove the nipple shield 102, 110, 118 (depending upon which was being used) and reward the baby with direct access to the nipple. This aids in the baby latching quickly, which may reduce the need for the mother to use multiple nipple shields.

Further, the first, second, and third apertures 108, 116, 124 allow a mother's nipple to exit the aperture when a child is suckling. It should be noted that the first, second, and third apertures 108, 116, 124 extend across the entirety of the top (distal to the base) circumference of the first, second, and third protrusions 106, 114, 122. With the system of nipple shields 100 comprising apertures 108, 116, 124, instead of rounded enclosed tips with a plurality of apertures taught in the prior art, the mother can avoid receiving blisters or other damage caused by her nipple pressing against the enclosed tip during a feeding. Specifically, as the child sucks, the woman's nipple is able to elongate and expand in the first protrusion 106 with the first aperture 108 without discomfort. Further, having apertures without a rounded, enclosed tip, allows many women, with varying sizes of breasts and nipples, to use the same set of nipple shields. Additionally, the use of the nipple shields 102, 110, 118 aids a child in suckling to a mother that may have inverted nipples. In other words, because the nipple shields 102, 110, 118 have a base 104, 112, 120, as the child suckles, the nipple is pulled through the aperture 108, 116, 124, allowing the child to properly latch to the nipple. In contrast, the prior art makes a woman determine which size of nipple shield fits them. It can be difficult, frustrating, and time consuming when trying to find the right size to use.

The second nipple shield 110 comprises the second protrusion 114 with the second aperture 116. Best shown in FIGS. 1A, 2B, and 4B, the second protrusion 114 extends outward from the pinnacle of the dome shaped second base 112 and is generally conical shaped. The second protrusion 114 may comprise a second height that is less than the first protrusion 106, but greater than the third protrusion 122. In one embodiment, the second protrusion 114 may be 24.67 mm from the bottom of the second base 112 to the top of the second protrusion 114, although other sizes may be used. Further, the second aperture 116 has a diameter that is wider than the first aperture 108 but narrower than the third aperture 124. For example, in one embodiment, the second aperture 116 may be a diameter of 17.50 mm. Again, it will be appreciated that other protrusion heights and aperture diameters may be used for the second nipple shield 110. With a protrusion height that is less than the first protrusion 106 and a second aperture 116 that is greater in diameter than the first aperture 108, a child is able to have more mouth-to-nipple contact with their mother, thereby getting the child accustomed to the feel and smell of its mother. In contrast, the prior art does not allow for mouth-to-nipple contact, which increases the dependency of the child to using the prior art nipple shield. As described herein, as the protrusion height lessens and the aperture diameter increases, a child will have less dependence on the shield and begin to transition directly to its mother, overcoming the issues in the prior art.

The third nipple shield 118 comprises the third protrusion 122 with the third aperture 124. The third protrusion 122 may comprise a third height that is less than the first and second protrusions 106, 114. In one embodiment, the third protrusion 122 has a height of 18.37 mm from the bottom of the third base 120 to the top of the third protrusion 122. However, it will be appreciated by those in the art that a third protrusion 122 can be numerous heights. For example, depending on the difficulty with breast feeding, the third protrusion 122 may have a greater height to more gradually wean a child off the nipple shield system 100. Further, the third aperture 124 is greater in diameter than the first and second apertures 108, 116, allowing a greater portion of the mother's nipple and breast to be exposed to a child during breastfeeding. In one embodiment, the third aperture 124 may have a diameter of 20.99 mm; however, the aperture diameter may vary for the third aperture 124. While the third nipple shield 118 allows for the greatest amount of nipple to protrude, it still aids in protecting the mother from the child's teeth while feeding. After a child becomes accustomed to its mother when using the third nipple shield 118, the next step is to remove the third nipple shield 118 and feed the child without the assistance of a nipple shield.

It will be appreciated that while contemplated as a system of weaning and gradually changing between nipple shields 102, 110, 118, such is not required. For example, a user may find that they do not need assistance with getting a baby to latch, but would still like some protection from biting. In such a scenario, the user may use the most open nipple shield 118 to protect against biting. Other uses may be envisioned where one nipple shield 102, 110, or 118 may be used individually and not part of a system of weaning.

In one embodiment, as shown in FIGS. 7A-9D, a system of nipple shields 200 comprises a first nipple shield 202 having a first base 204 with a first cutout portion 206, and a first protrusion 208 with a first aperture 210. A second nipple shield 212 comprising a second base 214 with a second cutout portion 216, and a second protrusion 218 with a second aperture 220. A third nipple shield 222 comprising a third base 224 with a third cutout portion 226, and a third protrusion 228 with a third aperture 230. The first, second, and third bases 204, 214, 224 may be made of a malleable material, such as silicone or any other malleable material suitable for suckling children. The first, second, and third bases may be dome shaped 204, 214, 224 so as to receive a portion of a breast. Further, the first, second, and third cutout portions 206, 216, 226 may allow a child to have more skin-to-skin contact with their mother, thereby providing a quicker transition from nipple shield to mother. For example, the nipple shield 202, 212, 222 may be positioned on the breast so that the cutout 206, 216, 226 allows the infant's nose to come into contact with the bare breast, allowing the infant to both contact and smell the mother. It will be appreciate that the first, second, and third cutout portions 206, 216, 226 may be any size or shape to allow more skin-to-skin contact between the mother and child.

The first nipple shield 202 comprises the first protrusion 208 that extends outward from the pinnacle of the dome shaped first base 204. The first protrusion 208 may be conically shaped and is greater in height than the second and third protrusions 218, 228. The first protrusion 208 gives the most protection to the mother as well as limiting the amount of nipple and breast exposed to the child. With the first nipple shield 202 having the greatest protrusion height, it is the most helpful in getting a baby to latch to its mother. Additionally, the first protrusion 208 comprises the first aperture 210. The first aperture 210 is a diameter that is less than both the second and third apertures 220, 230.

The second nipple shield 212 comprises the second protrusion 218 with the second aperture 220. The second protrusion 218 extends outward from the pinnacle of the dome shaped second base 214 and may be conical shaped. The second protrusion 218 comprises a height that is less than the first protrusion 208, but greater than the third protrusion 228. Further, the second aperture 220 has a diameter that is wider than the first aperture 210 but narrower than the third aperture 230. With a protrusion height that is less than the first protrusion 208 and a second aperture 220 that is greater in diameter than the first aperture 210, a child is able to have more mouth-to-nipple contact with their mother in addition to the second cutout portion 216, thereby getting the child accustomed to the feel and smell of its mother.

The third nipple shield 222 comprises the third protrusion 228 with the third aperture 230. The third protrusion 228 is a height that is less than the first and second protrusions 208, 218. Further, the third aperture 230 is greater in diameter than the first and second apertures 210, 220 allowing a greater portion of the mother's nipple and breast to be exposed to a child during breastfeeding. After a child becomes accustomed to its mother when using the third nipple shield 222, the next step is to remove the third nipple shield 222 and feed the child without the assistance of a nipple shield. As discussed in prior embodiments, the thickness and hardness of each nipple shield 202, 212, 222 (or at least the protrusion 208, 218, 228 of each, respectively) may vary. This may further aid in the weaning process. However, it will be appreciated that a change in thickness or hardness is not required and that the nipple shields may be consistent.

It will be appreciated that intermediate nipple shields, with various aperture diameters and protrusion heights, may be used so as to have a customizable fitting for each woman and their child. For example, instead of having three nipple shields in the system of nipple shields 100, 200 it could be envisioned that a system of nipple shields could have 4, 5, or more nipple shields in the system. Likewise, the system of nipple shields 100, 200 could have as few as one or two nipple shields depending on the needs of the mother and child. In one example, a mother and infant may only need to use one nipple shield to achieve the desired result. Accordingly, a system and method of using a nipple shield comprises a nipple shield having a base for receiving a portion of a breast and a protrusion extending outwardly from the base, the protrusion terminating in an aperture that encompasses the circumference of the protrusion (i.e., the top of the protrusion is completely open), allowing a nipple to exit when a child is suckling. Any of the embodiments in the Figures may be used alone for the foregoing example, or in combination, by a mother as part of the system.

The system of nipple shields 100, 200 gradually exposes more of the mother's breast and nipple to the child. The first nipple shield 102, 202 allows the child to learn proper latching and suckling. Once the child has learned proper latching, the mother can move to the second 110, 212 and third nipple shields 118, 222 which allows the child to become more comfortable with the smell and feel of its mother, and may also allow the woman's nipple to shape properly for latching. After the child is accustomed to its mother, the system is complete, allowing the mother to breastfeed her child without the assistance of a nipple shield.

It will be understood that elements from one embodiment can be used or combined with other embodiments. For example, elements used in the first embodiment, 100, may also be used in the second embodiment, 200, or vice versa. Further, it is important to note that the system of nipple shields 100, 200 reduces the risk that women will need to use a nipple shield as a long-term solution. With the design of the nipple shields in the prior art, it is difficult to wean a child off a nipple shield. If a child constantly depends on a nipple shield, then serious issues may arise, such as mastitis. At times, a nipple shield may prevent the child from draining the milk in a mother's breast, which may lead to an infection. Conversely, the system of nipple shields 100, 200 disclosed herein helps a mother remove the child's dependence on the nipple shield. This allows a child to get to a mother quicker, which helps remove the risk of infection, allows the baby to get milk more effectively, and allows for desired maternal bonding, with the child naturally gaining access to the mother's breast.

In one embodiment, a system and method of using nipple shields 100, 200 to transition the child away from a nipple shield and back to its mother comprises a mother using a first nipple shield 102, 202 having a first protrusion 106, 208 with a first aperture 108, 210, covering a majority of her nipple; transitioning a child to a second nipple shield 110, 212 having a second protrusion 114, 218 with a second aperture 116, 220 that covers less than the first nipple shield 102, 202; transitioning to a third nipple shield 118, 222 having a third protrusion 122, 228 with a third aperture 124, 230 that covers less than the first and second nipple shields 102, 202, 110, 212; and transitioning to a bare breast and nipple.

In one embodiment, a system and method of using a system of nipple shields 100, 200 to transition the child away from a mother and to a bottle comprises a mother using a third nipple shield 118, 222 having a third protrusion 122, 228 with a third aperture 124, 230, uncovering a majority of her breast; transitioning a child to the second nipple shield 110, 212 having a second protrusion 114, 218 with a second aperture 116, 220 that covers more than the third nipple shield 118, 222; transitioning to a first nipple shield 102, 202 having a first protrusion 106, 208 with a first aperture 108, 210 that covers more than the third and second nipple shields 118, 110, 212, 222; and, lastly, transitioning to a bottle.

Accordingly, it will be appreciated that the system of nipple shields 100, 200 has multiple functions: 1) it can transition a child away from a nipple shield and back to its mother; 2) it can transition a child from its mother to a bottle; and 3) any shield may be used independently for protection from biting. Further, it allows the mother the flexibility to determine what works best for her and her child. For example, a woman with an inverted nipple may use a different shield than a woman without inverted nipples. Or, one child may bite more than another, allowing the mother to select the shield that provides greater protection from teeth while still allowing mouth-to-nipple contact. On the other hand, the prior art nipple shield only has a single function, to aid in breastfeeding, and often creates additional issues, such as mastitis.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A method of using a system of nipple shields for use while breastfeeding, comprising:

breastfeeding using two or more nipple shields in sequence, wherein a user begins breastfeeding with a first nipple shield of the two or more nipple shields having a first protrusion having a first height with a first aperture extending across a top circumference of the first protrusion, the first aperture comprising a first diameter to thereby expose a first portion of a user's nipple during suckling;

transitioning to breastfeeding with a second nipple shield of the two or more nipple shields having a second protrusion having a second height less than the first height of the first protrusion, with a second aperture extending across a top circumference of the second protrusion to thereby expose the first portion and a second portion of the user's nipple during suckling.

2. A method of using a plurality of nipple shields for use while breastfeeding, comprising:

selecting a first nipple shield from the plurality of nipple shields for use while breastfeeding, the first nipple shield configured to allow a nipple of a user to protrude for a first length from an end thereof;

selecting a second nipple shield from the plurality of nipple shields for use while breastfeeding, the second nipple shield configured to allow the nipple to protrude for a second length from an end thereof, the second length greater than the first length of the first nipple shield.

* * * * *